Patented Apr. 2, 1946

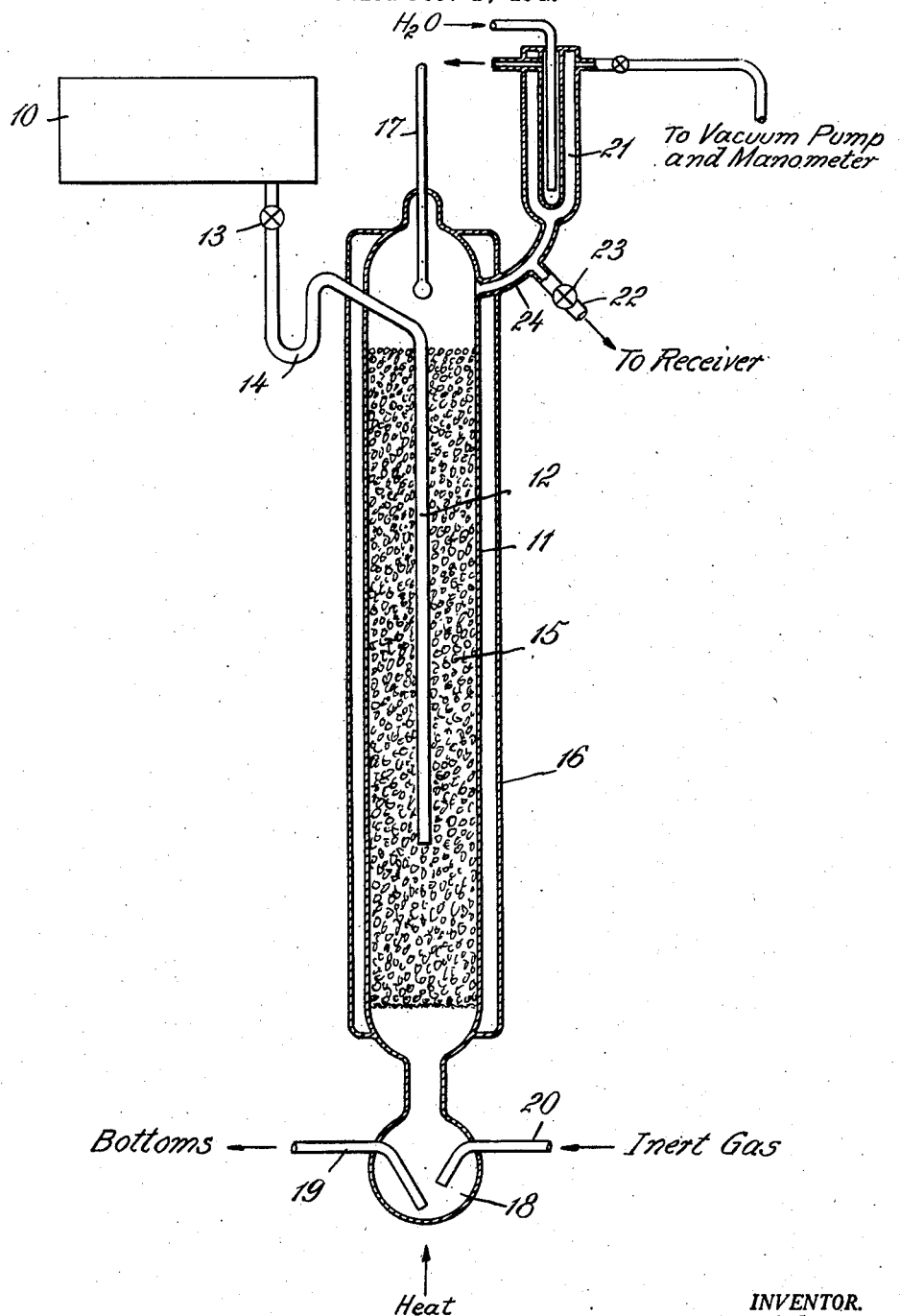

2,397,653

UNITED STATES PATENT OFFICE 2,397,653

DISTILLATION OF POLYMERIZABLE COMPOUNDS

Edwin R. Erickson, Niagara Falls, N. Y., assignor to The Mathieson Alkali Works, Inc., New York, N. Y., a corporation of Virginia Application December 1, 1942, Serial No. 467,529

5 Claims. (Cl. 202—57)

This invention is concerned with the distillation of materials that are susceptible to polymerization upon heating. It is concerned particularly with the distillation of heat-polymerizable vinyl compounds, and provides improvements to the end that polymerization of such materials and compounds is inhibited at all stages of distillation.

Styrene and variously substituted styrenes, as well as other polymerizable vinyl compounds tend to yield considerable proportions of polymeric materials when they are distilled, with resultant decrease in the yield of the desired monomeric products. It has been proposed heretofore to prevent such polymerization through the use of various inhibitors, both volatile and non-volatile. Non-volatile inhibitors tend to remain in the still-pot, with the result that in the rest of the distillation system the polymerizable material is unprotected and polymerization occurs. On the other hand, a comparatively volatile inhibitor tends to distill rapidly out of the system, so that the polymerizable material becomes unprotected in the entire system.

In accordance with my invention, the distillation of a polymerizable material, for example a heat polymerizable vinyl compound, is conducted in the presence of a small proportion of an inhibitor for the polymerization, which inhibitor is soluble in the compound and has substantially the same vapor pressure characteristics as the compound in the temperature range prevailing in the distillation system. Preferably, the inhibitor is such that it forms an azeotropic mixture with the compound, thereby insuring the presence of the inhibitor in all phases and in all parts of the distillaton system.

I have discovered further that the operation is greatly improved, especially when fractionation is involved, if the polymerizable compound to be distilled is introduced (preferably continuously) into the distillation zone by passing in indirect heat exchange relationship through at least a part of the fractionating zone, the passage preferably being countercurrent. Thus, it is desirable to pass the cold charge of polymerizable material to be distilled countercurrently through the fractionation zone of a distillation system in indirect heat exchanging relationship therewith, and to introduce the material into the distillation system in the lower part thereof and preferably in the lower part of the fractionation zone and just above the still-pot or boiling zone. In this manner the entering charge serves to cool the upper part of the fractionating zone at the same time that the charge is being heated. In such an operation, the charge cannot be superheated and enters the lower part of the distillation system (say the lower part of the fractionating column), at just the right temperature to be flashed into vapor. To provide heat for this latter purpose, the lower part of the column should be slightly superheated.

I have found that this method of operation, with cooling of the upper part of the fractionating zone and superheating of the lower part, brings about marked improvement in efficiency of fractionation and appears to be equivalent in effect to a considerable number of theoretical plates in the distillation system. It offers a marked improvement over operations in which the charge is first heated on the outside and introduced into the center of the column and is also superior in result to an operation in which the charge is introduced continuously into the still-pot or is placed initially in the still-pot in a batch distillation.

In operating in accordance with my invention, the inhibitor selected in any particular case is such that it is soluble in the polymerizable material to be distilled and has substantially the same vapor pressure as the polymerizable material, so that it is at all times present in both liquid and gaseous phases and in all parts of the system. As indicated above, it is particularly advantageous to employ an inhibitor that forms an azeotropic mixture with the polymerizable material.

In selecting the inhibitor, attention must be paid to the particular temperature range in which the distillation is to be performed. Thus, an inhibitor which may be suitable for use in the distillation of a particular polymerizable material at one range of temperatures may be unsuitable in another range. For example, a particular inhibitor may have nearly the same vapor pressure as a particular polymerizable material over one range of temperature but a substantially different vapor pressure, as compared with the polymerizable material, at another range of temperature. Consequently, although the vapor pressure curves of a polymerizable material and of an inhibitor may be sufficiently close together over a wide range of temperature, the possibility of a wide divergence at some points should not be overlooked, and the operation must be conducted so that the vapor pressures of the polymerizable material and the inhibitor are approximately the same in the temperature range prevailing during the distillation.

As indicated above, the solubility of the inhibitor in the polymerizable material as well as their relative vapor pressure is important. Thus, in the distillation of many vinyl compounds, inhibitors such as sulfur, metals and hydroquinones are ineffective, probably because of lack of solubility in the material subjected to distillation. On the other hand, catechols and resorcinols, and particularly their alkyl derivatives are, in general, soluble in vinyl compounds and hence effective if they possess the correct vapor pressure relationship for the temperature range at which the distillation is conducted.

It is not necessary to employ large proportions of the inhibitors. Small proportions, usually 1% or less, are adequate. The proportion of the inhibitor may be 0.1% to .05% or less, although proportions in excess of 1% may be used without harmful result.

In the practice of my invention, it is desirable to employ apparatus of the type illustrated in the accompanying single figure which is a schematic sectional view through a distillation apparatus, including a still-pot, a fractionating column and a reflux column.

Referring to the drawing, it will be observed that the apparatus comprises a charge tank 10 to which is supplied the crude polymerizable material having dissolved therein a selected inhibitor. The charge passes into a fractionating column 11 through a pipe 12 provided with a valve 13 for control purposes and a liquid seal 14 to prevent escape of vapor from the column. The pipe enters the fractionating column near the top thereof and passes downward centrally therein to a point near the bottom of the fractionating column and thus discharges the material into a lower portion of the column.

Otherwise the fractionating column is of conventional design and is provided with suitable packing 15 and enclosed in a suitable jacket 16 which may be employed for insulation or thermal control purposes.

A thermometer 17 or other heat indicating device is provided at the top of the fractionating column.

The bottom of the fractionating column is connected to a still-pot or boiler 18, provided with a conduit 19 from which bottoms may be withdrawn and also provided with a conduit 20 through which inert gas may be introduced into the distillation system, if desired.

The top of the fractionating column is connected by a conduit 24 to an indirect water cooled reflux column 21. The bottom of the reflux column is provided with a drain pipe 22 having a control valve 23 that may be regulated to adjust the proportion of condensed distillate returning to the fractionation column and conversely the proportion of such distillate removed from the system. The drain from the reflux column is connected to a conventional receiver (not shown).

In starting the operation in the apparatus just described, a small quantity of the charge containing the inhibitor is introduced into the apparatus from the charge tank and flows into the still-pot, where it is vaporized to start the fractionating operation and to produce some refluxing. Thereafter, the charge is introduced continuously and distillate and bottoms are continuously withdrawn, the effort being to minimize the time that any given part of the charge is subjected to heating. Thus, very little polymerizable charge is heated at one time and that part is heated for only a short interval. Under these conditions of operation, the polymerizable material is not permitted to accumulate in the still-pot, at least to any substantial degree, and the small amount of high boiling bottoms in the still pot serves to reboil the tower. For this purpose, in the distillation of relatively pure materials, it may be desirable to add a small percentage of higher boiling material to serve this re-boiling function, i. e., the function of transmitting heat from the still-pot into the fractionating column.

In the following detailed examples, the practice of my invention is described with reference to the distillation of crude dichlorostyrene, although the operation is also applicable to other polymerizable materials, it being understood, however, that the particular inhibitor employed must be selected with regard to the vapor pressure of the polymerizable material in the particular temperature range prevailing in the distillation.

*Example 1*

Mixed dichlorostyrenes as well as the individual isomers thereof tend to polymerize easily, especially under the influence of heat, and are therefore selected for purposes of illustrating the invention. Employing the apparatus just described, mixed dichlorostyrenes were subjected to distillation employing a variety of inhibitors. It was found that, employing tertiary butylcatechol in proportions ranging from .1 to .4%, the yield of monomeric dichlorostyrene was 93%, indicating that the vapor pressure of the tertiary butylcatechol and its solubility were both satisfactory. In another test, a larger proportion of tertiary butylcatechol is employed as an inhibitor. In fact, the crude dichlorostyrene was nearly saturated with tert-butylcatechol at room temperature. In this distillation, a yield of monomeric dichlorostyrene of 98% was obtained, again indicating that the solubility and the comparative volatility of this inhibitor under the conditions of operation were excellent.

For comparative purposes, a variety of other inhibitors were employed, and the distillation was also conducted without any inhibitor at all.

Without employing an inhibitor, the yield of monomeric dichlorostyrene was 53%. This was raised to only 55% when .1% of sulfur was employed, the solubility of the sulfur being too low and the volatility of the sulfur under the conditions of the operation being negligible.

A metallic inhibitor, in this case aluminum, was also employed. Its volatility and solubility were both negligible and the yield of monomeric dichlorostyrene obtained through its use was only 78%.

A test conducted with .05% of diphenylamine gave a yield of 65%.

Triphenylguanidine in proportions of .1% gave a yield of 75%, due to the fact that the melting point of this inhibitor was too high and its volatility insufficient.

Tests with hydroquinone and chlorohydroquinone gave unsatisfactory results because they were too volatile and insufficiently soluble. Employing these inhibitors, the outlet of the fractionating column became clogged.

Bromohydroquinone in proportions of .25% was too volatile and insufficiently soluble and gave a yield of only 55%.

Chloranil, although satisfactory from the standpoint of solubility, was slightly too volatile. This compound gave a yield of 80%, but the product was undesirably colored.

Tetrachlorohydroquinone is insufficiently soluble and insufficiently volatile, and in various proportions ranging from .1 to .25% gave yields of 60% to 82%.

Example 2

Two samples of dichlorostyrene containing small proportions of alphachloroethyl dichlorobenzene and other impurities, were treated in the presence of small amounts, i. e., about .1%, of tertiary butylcatechol which readily dissolved in the charge. The charge so prepared was treated by continuous distillation in the apparatus described hereinbefore and with inlet-rates and take-off rates substantially equal. The other data with respect to the operation and the results thereof are given in the following table:

| Example | Press. mm. Hg | Temp., °C. | $N_D^{25}$ Crude | $N_D^{25}$ Dist. | Side chain Cl, percent | Dichlorostyrene, percent |
|---|---|---|---|---|---|---|
| 1 | 1-2 | 67-68 | 1.5800 | 1.5800 | .09 | 95 |
| 2 | | | 1.5792 | 1.5805 | .05 | 95 |

It will be observed that substantially complete recovery of the dichlorostyrene, without loss of product to the polymer, was obtained in both cases.

Example 3

The distilling pot was charged with 225 ml. of 50% crude dichlorostyrene containing about 1% tert. butyl catechol and equilibrium conditions were established at a pressure of 3 mm., a vapor temperature of 67.5 to 68.5° C. and a charge rate approximately equal to the take-off rate. A small stream of nitrogen bubbled through the contents of the still-pot. Then 600 ml. of fair dichlorostyrene was put through the still to obtain a yield of about 650 ml. of good quality dichlorostyrene having $N_D^{25} = 1.5790$. This is about 93% recovery of the dichlorostyrene. The contents of the stillpot at the end of the run were relatively non-viscous indicating the absence of polymeric by-products.

I claim:

1. In distilling a polymerizable compound involving treatment of the distillate in a fractionation zone, the improvement which comprises introducing the polymerizable compound to the distillation by passing it in indirect heat exchange relationship through the fractionation zone and conducting the distillation and fractionation in the presence of a small proportion of an inhibitor for the polymerization, which inhibitor is soluble in the compound and has substantially the same vapor pressure as the compound at the temperature range prevailing in the distillation.

2. In distilling a polymerizable compound involving treatment of the distillate in a fractionation zone, the improvement which comprises introducing the polymerizable compound into the fractionation zone by passing it in countercurrent indirect heat exchange relationship through the fractionation zone and conducting the distillation and fractionation in the presence of a small proportion of an inhibitor for the polymerization, which inhibitor is soluble in the compound and has substantially the same vapor pressure as the compound at the temperatures prevailing in distillation and fractionation.

3. In distilling a polymerizable vinyl compound involving treatment of the distillate in a fractionation zone, the improvement which comprises introducing the polymerizable compound to the distillation by passing it in countercurrent indirect heat exchange relationship through the fractionation zone and conducting the distillation and fractionation in the presence of a small proportion of an inhibitor for the polymerization, which inhibitor is soluble in the compound and has substantially the same vapor pressure as the compound at the temperatures of operation.

4. In the distillation of monomeric dichlorstyrene compound, the improvement which comprises conducting the distillation in the presence of a small proportion of tertiary butyl catechol under a pressure of from about 1-3 mm. of mercury and at a temperature of from about 67°-68.5° C., the vapor pressures of the dichlorstyrene and the catechol under these conditions being substantially the same.

5. In distilling a monomeric dichlorstyrene involving treatment of the distillate in a fractionation zone, the improvement which comprises introducing the polymerizable compound to the distillation by passing it in indirect heat exchange relationship through the fractionation zone and conducting the distillation and fractionation in the presence of a small proportion of tertiary butyl catechol at a temperature at which the dichlorstyrene and the catechol have substantially the same vapor pressures.

EDWIN R. ERICKSON.